(12) United States Patent
Venca et al.

(10) Patent No.: US 6,970,316 B2
(45) Date of Patent: Nov. 29, 2005

(54) WRITE HEAD DRIVER CIRCUIT AND METHOD FOR WRITING TO A MEMORY DISK

(75) Inventors: Alessandro Venca, San Jose, CA (US); Baris Posat, Campbell, CA (US); Kemal Ozanoglu, Palo Alto, CA (US); Roberto Alini, Dublin, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 313 days.

(21) Appl. No.: 09/991,557

(22) Filed: Nov. 9, 2001

(65) Prior Publication Data

US 2003/0090828 A1 May 15, 2003

(51) Int. Cl.[7] .............................................. G11B 15/12
(52) U.S. Cl. ................................................... 360/61
(58) Field of Search ........................... 360/61, 46, 60, 360/68, 51, 53, 66, 67; 327/110, 108, 246, 323

(56) References Cited

U.S. PATENT DOCUMENTS

| | | | |
|---|---|---|---|
| 4,551,772 A | | 11/1985 | Sliger ........................... 360/46 |
| 4,937,802 A | * | 6/1990 | Omori et al. ............. 369/13.22 |
| 5,041,773 A | | 8/1991 | Takahashi .................... 318/696 |
| 5,434,717 A | | 7/1995 | Yoshinaga et al. ............. 360/46 |
| 5,892,371 A | * | 4/1999 | Maley .......................... 326/81 |
| 6,052,017 A | * | 4/2000 | Pidutti et al. ................. 360/46 |
| 6,054,888 A | * | 4/2000 | Maley ......................... 327/333 |
| 6,121,800 A | * | 9/2000 | Leighton et al. ............. 327/110 |
| 6,201,421 B1 | * | 3/2001 | Takeuchi et al. ............ 327/110 |
| 6,236,246 B1 | * | 5/2001 | Leighton et al. ............ 327/110 |
| 6,252,450 B1 | * | 6/2001 | Patti et al. ................... 327/424 |
| 6,400,190 B1 | * | 6/2002 | Lacombe ..................... 360/68 |
| 6,504,666 B1 | * | 1/2003 | Patti et al. .................... 360/68 |

OTHER PUBLICATIONS

"Microelectronic Circuits" by Sedra/Smith, 4th Edition, 1998, Chapter 6, Section 6.2, Titled: "Common Mode Gain" on pp. 499–501.*
U.S. Appl. No. 09/651,561, filed Aug. 30, 2000, Alini.
U.S. Appl. No. 09/651,830, filed Aug. 30, 2000, Alini et al.
U.S. Appl. No. 09/839,511, filed Apr. 20, 2001, Patti et al.

* cited by examiner

*Primary Examiner*—Sinh Tran
*Assistant Examiner*—Glenda P. Rodriguez
(74) *Attorney, Agent, or Firm*—Lisa K. Jorgenson; Andre Szuwalski

(57) ABSTRACT

A circuit and method are disclosed for relatively rapidly causing the current flowing through a write head to transition between steady states without generating an appreciable amount of capacitively-coupled noise. Embodiments of the present invention generally provide drive voltage signals to the write head that have no common mode voltage levels during transitions between steady state current levels in the write head. In other words, the drive voltage signals applied to the write head are substantially entirely differential during write head current transitions. In an exemplary embodiment of the present invention, a driver circuit includes switching circuitry connected between the terminals of the write head and reference voltage supplies, such as positive and negative voltage supplies. The driver circuit further includes timing circuitry that generates control signals for controlling the switching circuitry.

24 Claims, 5 Drawing Sheets

WRITE HEAD DRIVER CIRCUIT AND METHOD FOR WRITING TO A MEMORY DISK

CROSS REFERENCE TO RELATED APPLICATION

This application is related to U.S. patent application Ser. No. 09/651,830, filed Aug. 30, 2000, entitled "METHOD FOR DIFFERENTIALLY WRITING TO A MEMORY DISK"; and to U.S. patent application Ser. No. 09/651,561, filed Aug. 30, 2000, entitled "WRITE HEAD DRIVER CIRCUIT AND METHOD FOR WRITING TO A MEMORY DISK".

BACKGROUND OF THE INVENTION

1. Technical Field of the Invention

The present invention relates to circuit and method for writing to a memory disk, and particularly to a circuit and method for differentially driving the write head of a disk drive device.

2. Background of the Invention

Most computer systems include one or more associated disk drives, which may be built into or external to the computer system. Typically, disk drives have at least one rotating magnetic medium and associated head mechanisms that are carried adjacent the magnetic material. The heads are radially positionable to selectively write information to, or read information from, precise positions on the disk medium. Such disk drives may be, for example, hard disk drives, floppy drives, or the like.

Data is written to the associated data disk by applying a series of signals to a write head according to the digital information to be stored on the magnetic disk media. The write head has a coil and one or more associated pole pieces that are located in close proximity to the disk media. As signals cause the magnetic flux to change in the head, the magnetic domains of the magnetic media of the disk are aligned in predetermined directions for subsequent read operations. Typically, a small space of unaligned magnetic media separates each magnetic domain transition to enable successive transitions on the magnetic media to be distinguished from each other.

Since the disk is moving relative to the head, it can be seen that if the small space separating the magnetic domain transitions is not sufficiently wide, difficulty may be encountered in distinguishing successive magnetic transitions. This may result in errors in reading the data contained on the disk, which is, of course, undesirable.

Meanwhile, as computers are becoming faster, it is becoming increasingly important to increase the speed at which data can be written to and read from the disk media. However, since the data signals are in the form of square wave transitions, if the rise time of the leading edges of the square waves is large, the small space between magnetic media transitions also becomes large, which reduces the effective rate at which data can be accurately written and read. Since the write head assembly includes at least one coil, forcing the current to rise rapidly, or to reverse flux directions within the write head is difficult.

In the past, data writing circuits and/or write drive circuits used to supply such write signals to the heads included preamplifier circuits to drive the current through selected legs of an "H-bridge" circuit, which is capable of allowing relatively fast current reversals for accurate data reproduction.

An example of a typical H-bridge write head drive circuit 10, according to the prior art, is shown in FIG. 1. The circuit 10 includes four MOS transistors, 12–15 connected between a high reference voltage $V_{cc}$ and a low reference voltage Vss. A coil 19, used, for example, to supply data pulses for writing to a disk drive media is integrated into the write head mechanism. The coil 19 is connected between the center legs of the H-bridge, as shown.

It can been seen that, depending on the gate biases applied to the respective transistors 12–15, the current flows through the coil 19 in one direction or another. That is, one current flow path includes the transistor 14, coil 19 from right to left, and transistor 13. The other current flow path includes transistor 12, the coil 19 from left to right, and the transistor 15.

In the H-bridge circuit 10, the transistor 12 and 14 serve as switching transistors, which are controlled by the out-of-phase signals on a pair of respective input lines 28 and 29. The transistors 13 and 15 serve as current controlling transistors, which are controlled by the out-of-phase signals on the respective input lines 29 and 28 in a manner opposite from the connections to the switching transistors 12 and 14, via respective control transistors 31 and 32. The magnitude of the current through the transistors 13 and 15 is controlled by a transistor 21, with which the transistors 13 and 15 form respective current mirrors, when connected via respective transmission gates 24 and 25. The transmission gates 24 and 25 are controlled by the signals on the respective input lines 29 and 28, in the same manner as the associated transistors 31 and 32. A reference current source 26 supplies the reference current to the transistor 21, which is mirrored by currents in respective transistors 13 and 15, as described above. In conventional driver circuits for controlling the write head of a disk drive, the steady state voltage levels to which the two terminals of write head 19 settle are both typically near either the high reference voltage level Vdd or the low reference voltage level Vss.

One problem encountered in disk drives employing existing drive circuitry for the write head coil 19 is that the wires or lines connecting the write head coil 19 to the write drive circuitry are located proximally to the wires or lines connecting the read head to the read channel circuitry (not shown in FIG. 1). The close proximity between the wires capacitively couples the wires together. As a result, voltage spikes or other voltage transitions appearing on the lines connected to write head coil 19 may have a greater tendency to appear as noise on the lines connected to the read head of the disk drive and potentially damage the read head as a result.

Because of the inductive nature of the write head coil 19 and because conventional steady state voltage levels for the write head terminals are approximately near the high reference voltage level Vcc, a relatively sizeable voltage spike typically may be generated on a terminal of write head 19 (the terminal of write head 19 having a voltage signal experiencing a falling transition) during the time that the current passing through write head 19 transitions from one direction to another. In other words, a relatively sizeable voltage spike appears on a terminal of the write head when the write head transitions between steady states. As can be seen, this relatively sizeable voltage spike may be capacitively coupled to the lines associated with the read head of the disk drive and thereby damage the read head.

As data rates increase, the rates at which the heads can accurately write the data to the magnetic media is limited by the speed at which the flux in the coil 19 (and its associated components) can be reversed. Relatedly, the amplitude of voltage spikes appearing on a write head terminal (and noise appearing on the corresponding read head terminals) is based in part upon the rate of flux reversal. The maximum data rate is thus limited to the maximum physical flux reversal rate of the write head drive circuitry and the maximum allowable noise that may be tolerated at the read head during the period of flux reversal.

What is needed, therefore, is a method and circuit for driving an inductive load of the type used in conjunction with a write head of a disk drive with a signal that enables a maximum flux reversal rate in the driver coil in an absence of an appreciable amount of noise on lines capacitively coupled to the inductive load.

SUMMARY OF THE INVENTION

Embodiments of the present invention overcome shortcomings in prior write head drive circuitry and satisfy a significant need for a write head circuit and method that effectively drives the write head of a memory disk device so that the write head transitions between steady state conditions relatively rapidly with relatively little noise levels appearing at the read head of the memory disk device. Embodiments of the present invention generally provide drive voltage signals to the write head that have no common mode voltage levels during transitions between steady state current levels in the write head. In other words, the drive voltage signals applied to the write head are substantially entirely differential during write head current transitions.

In an exemplary embodiment of the present invention, a driver circuit includes switching circuitry connected between the terminals of the write head and reference voltage supplies, such as positive and negative voltage supplies. The driver circuit further includes timing circuitry that generates control signals for controlling the switching circuitry. During the time the current flowing through the write head changes direction or otherwise transitions between steady state current levels, the timing circuitry controls the switching circuitry so that in a first time period, a first terminal of the write head is driven to a first voltage level and a second terminal of the write head is driven to a second voltage level. In a second time period following the first time period, the first terminal is driven to a third voltage level and the second terminal is driven to the fourth voltage level. The first, second, third and fourth voltage levels form drive signals for the write head having no common mode voltage. For example, the first and fourth voltage levels may be at the level of the negative supply voltage, and the second and third voltage levels may be at the level of the positive supply voltage. Alternatively, the third and fourth voltage levels may be approximately zero volts.

A method of driving a write head, in accordance with an exemplary embodiment of the present invention, includes sourcing a first steady state current level to the first terminal of the head and sinking the first steady state current level from the second terminal of the head. Next, the method includes driving, during a first time period, the first terminal of the head to a first voltage level and driving the second terminal to a second voltage level so as to reverse the direction of current flow in the head. Following the first time period, the first terminal is driven during a second time period to a third voltage level and the second terminal is driven to a fourth voltage level. The first, second, third and fourth voltage levels form drive signals for the head having approximately zero common mode voltage. Thereafter, a first steady state current level is sunk from the first terminal and the first steady state current level is sourced to the second terminal.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE EXEMPLARY EMBODIMENTS

The present invention will now be described more fully hereinafter with reference to the accompanying drawings in which exemplary embodiments of the invention are shown.

Figure 1:
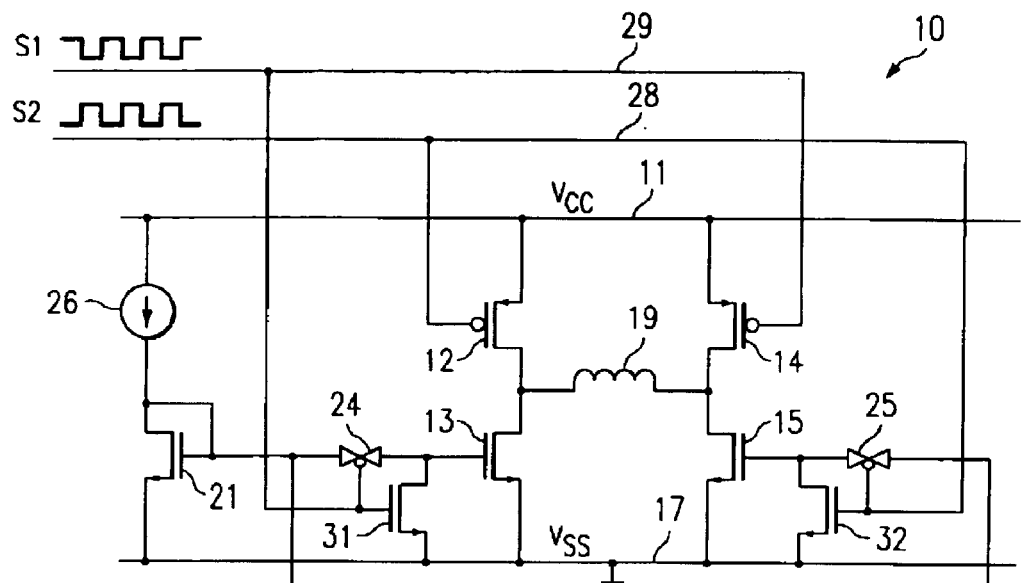
FIG. 1 illustrates a schematic diagram of a conventional H-bridge driver circuit for a write head of a disk storage device, as described above.
Figure 2:
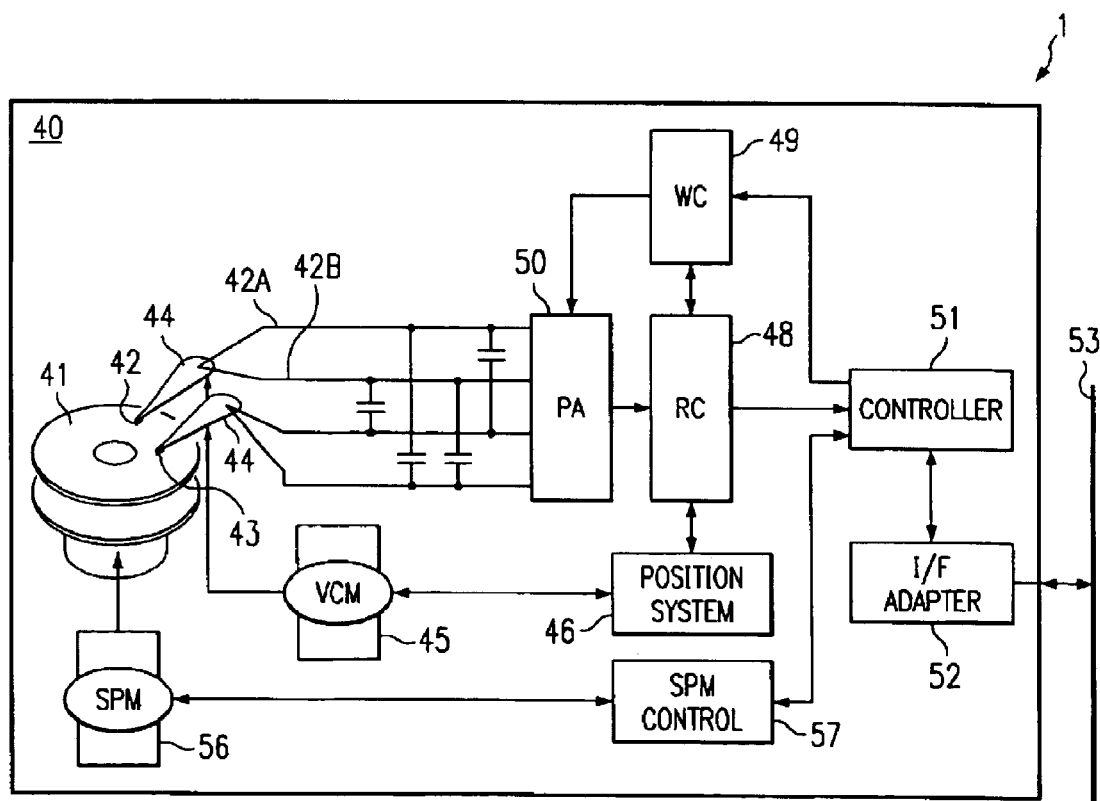
FIG. 2 illustrates a function block diagram of a system including a disk drive device according to an embodiment of the present invention.

Referring to FIG. 2, there is shown a block diagram of a data storage, information processing and/or computer system 1 including a disk drive 40 in accordance with the present invention. Disk drive 40 includes a storage medium in the form of one or more disks 41, each of which may contain data on both sides of the disk. Data is written to disks 41 using one or more write heads 42, and read therefrom by one or more read heads 43. Each write head 42 and read head 43 is connected to an arm 44 and is positionally controlled by a voice-coil motor ("VCM") 45 and a position system 46. The position system 46, through VCM 45, positionally maintains and/or moves write head 42 and read head 43 radially over the desired data on disks 41. A read channel 48 converts an analog read signal from read head 43 into digital form. A write channel 49 provides data in analog form to write head 42 for storing on a disk 41. A preamplifier 50 suitably conditions data read from and data to be written to disk 41. Channel controller 51 recognizes and organizes the digital data from the read channel 48 and digital data to be sent to write channel 49 into bytes of data. An interface adapter 52 provides an interface between channel controller 11 and a system bus 53 that may be particular to the host (data storage, information processing and/or computer) system 1. The host system 1 will also typically have other devices that communicate on system bus 53, including a central processing unit ("CPU") 54 and volatile memory 55. A spindle motor ("SPM") 56 and SPM control circuit 57 rotate disk 41 and maintain disk 41 at the proper speed for performing a memory access operation (read or write operation). The SPM control circuit 57 may communicate with interface adapter 52 or controller 51, as shown in FIG. 2. It is understood that disk drive 40 may be divided into and/or include other function blocks from those shown in FIG. 2, and that the particular function block implementations illustrated in FIG. 2 are presented as an exemplary embodiment of the present invention.

Figure 3:
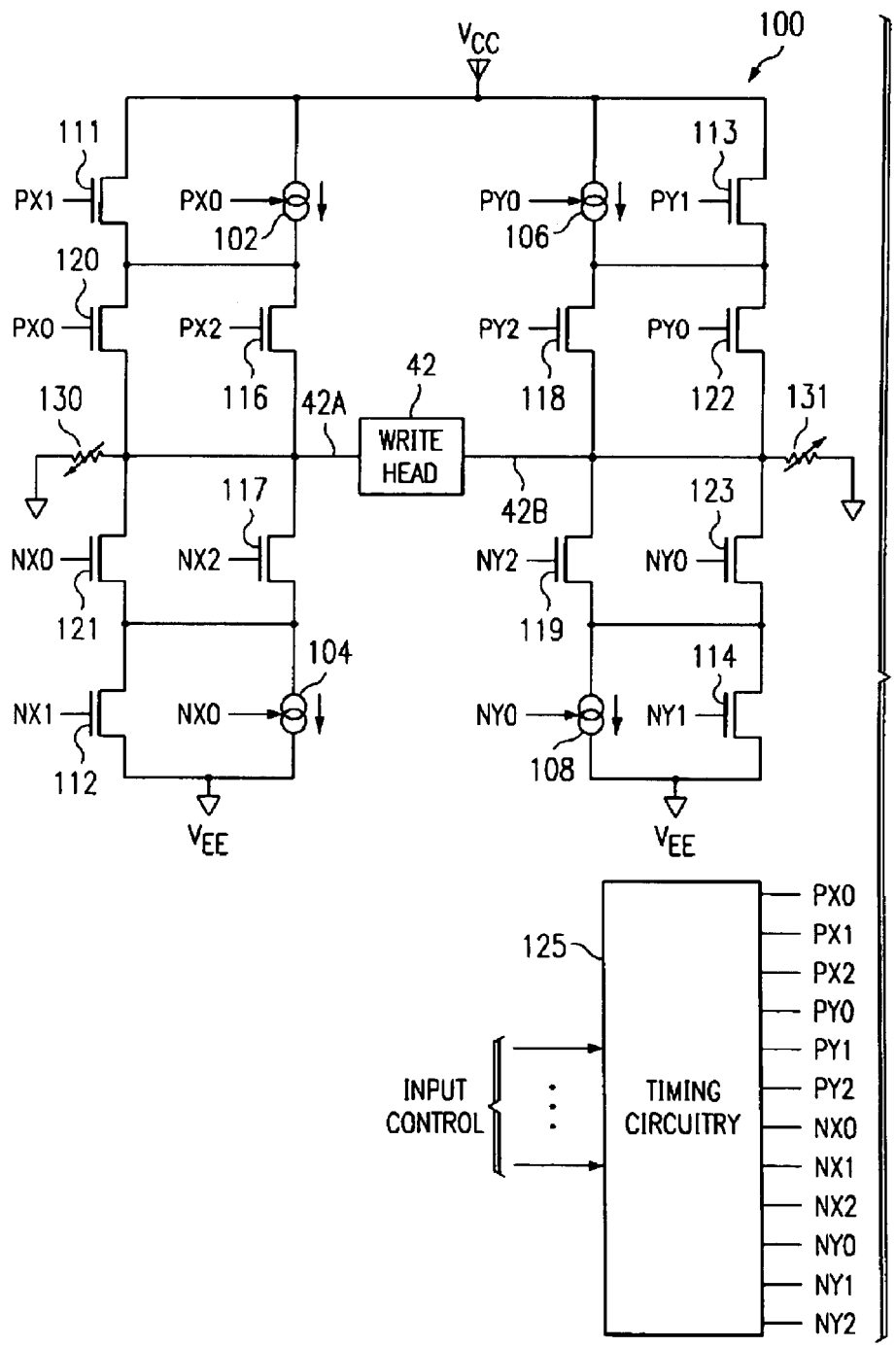
FIG. 3 illustrates a schematic diagram of a driver circuit for a write head of the disk drive device of FIG. 2.

Referring to FIG. 3, there is shown a driver circuit 100 for driving the write head 42 of a magnetic disk storage device.

Driver circuit 100 is implemented as an H-bridge circuit wherein current is provided to write head 42 through selected legs of driver circuit 100 for writing data onto an associated magnetic storage disk. Driver circuit 100 is located within preamplifier block 50.

In general terms, driver circuit 100 applies drive signals to write head 42 so that the amount of time for transitioning current in write head 42 is substantially reduced without introducing noise levels elsewhere in disk drive 42, including noise on read head 43 due to parasitic coupling capacitors that may exist between write head 42 and read head 43. The drive signals applied to write head 42 have little if any common mode voltage during current transitions between steady state current levels of the write head current.

In accordance with an exemplary embodiment of the present invention, driver circuit 100 includes a plurality of current sources for providing steady state current levels to write head 42. A current source 102 is connected between a positive voltage supply Vcc and a first terminal 42a of write head 42, and a current source 104 is connected between first write head terminal 42a and a negative voltage supply Vee. Similarly, current source 106 is connected between positive voltage supply Vcc and a second terminal 42b of write head 42, and a current source 108 is connected between write head terminal 42b and the negative voltage supply Vee. Current sources 102 and 108 are connected to write head 42 to source a steady state current to and sink the steady state current from write head 42, respectively, in a first steady state condition. In addition, current sources 106 and 104 are connected to write head 42 to source a steady state current to and sink the steady state current from write head 42, respectively, in a second steady state condition.

Figure 4:
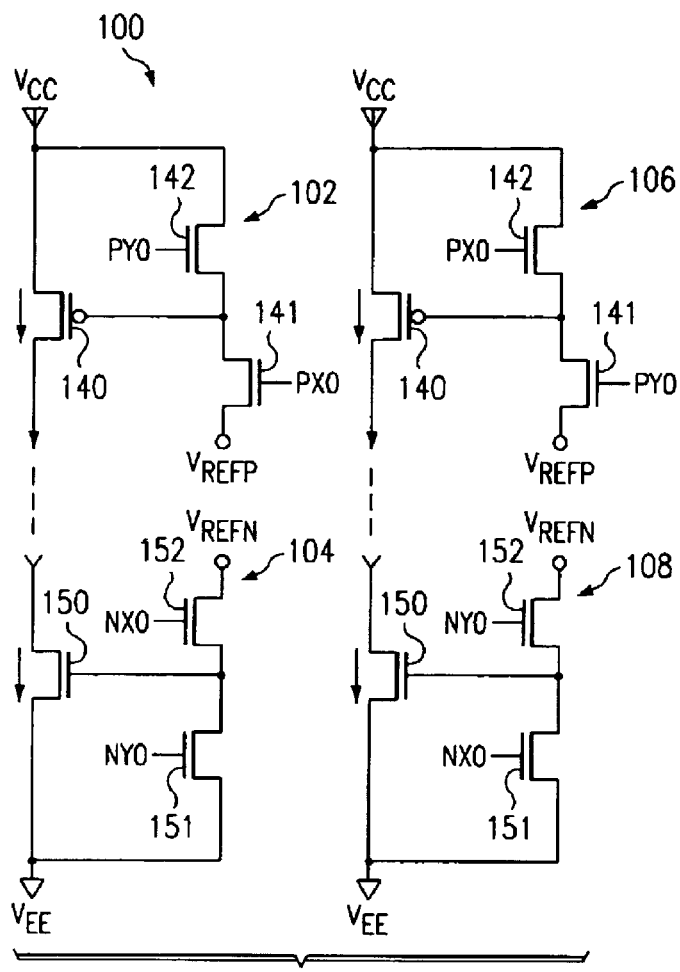
FIG. 4 is a schematic diagram of a portion of the driver circuit of FIG. 3.

Current sources 102, 104, 106 and 108 are selectively enabled to source/sink current. When enabled, each current source 102, 104, 106 and 108 allows a current to pass therethrough. FIG. 3 illustrates each current source 102, 104, 106 and 108 having an enable input connected to a control signal, the generation of which is described below. When the enable signal is asserted (i.e., driven to a voltage corresponding to a logic one), current flows through the current source. FIG. 4 illustrates a portion of driver circuit 100, and particularly an implementation of current sources 102, 104, 106 and 108 according to an exemplary embodiment of the present invention. Current sources 102 and 104 include a primary transistor 140 and control transistors 141 and 142 which are selectively activated to turn primary transistor 140 on and off. Only one control transistor 141, 142 is activated at a time, and one of control transistors 141 and 142 is activated when driver circuit 100 is operating. As a result, the signal driving the gate terminal of transistor 141 is the logical complement of the signal driving the gate terminal of transistor 142. In this case, signal py0 is the logical complement of signal px0, as described below. As can be seen, when control signal px0 (py0) is asserted, reference voltage Vrefp is connected to the gate terminal of primary transistor 140 of current source 102 (106), which turns on primary transistor 140 so as to conduct current. When control signal px0 (py0) is de-asserted, positive voltage supply Vcc is connected to the gate terminal of primary transistor 140 of current source 102 (106), which turns off primary transistor 140 so that no current flows.

Current sources 104 and 108 include a primary transistor 150 and control transistors 151 and 152 which are selectively activated to turn primary transistor 150 on and off. Only one control transistor 151, 152 is activated at a time, and one of control transistors 151 and 152 is activated when driver circuit 100 is operating. As a result, the signal driving the gate terminal of transistor 151 is the logical complement of the signal driving the gate terminal of transistor 152. In this case, signal ny0 is the logical complement of signal nx0, as described below. As can be seen, when control signal nx0 (ny0) is asserted, reference voltage Vrefn is connected to the gate terminal of primary transistor 150 of current source 104 (108), which turns on primary transistor 150 so as to conduct current. When control signal nx0 (ny0) is de-asserted, negative voltage supply Vee is connected to the gate terminal of primary transistor 150 of current source 104 (108), which turns off primary transistor 150 so that no current flows.

In the exemplary embodiment of the present invention, driver circuit 100 includes switching circuitry which is connected between positive voltage supply Vcc, write head terminals 42a and 42b, and negative voltage supply Vee. The switching circuitry may include switching transistors for selectively connecting current sources 102, 104, 106 and 108 to write head 42 (during steady state conditions), and for selectively connecting write head 42 to positive voltage supply Vcc and negative voltage supply Vee (during transitions between steady state conditions).

In particular, the switching circuitry may include first transistor 111 connected in parallel with current source 102, transistor 112 connected in parallel with current source 104, transistor 113 connected in parallel with current source 106 and transistor 114 connected in parallel with current source 108. Further, the switching circuitry may include transistor 116 connected between current source 102 and write head terminal 42a, and transistor 117 connected between current source 104 and write head terminal 42a. The phrase "connected in parallel" is used to refer to a transistor having its conduction (drain, source) terminals connected across another component. Transistor 118 is connected between current source 106 and write head terminal 42b and transistor 119 is connected between current source 108 and write head terminal 42b.

Still further, the switching circuitry may include transistor 120 connected in parallel with transistor 116, transistor 121 connected in parallel with transistor 117, transistor 122 connected in parallel with transistor 118 and transistor 123 connected in parallel with transistor 119. Although the transistors of the switching circuitry are shown in FIG. 3 as n-channel transistors, it is understood that the transistors of the switching circuitry may be implemented differently, such as with different types of transistors.

Driver circuit 100, in accordance with the exemplary embodiment of the present invention, includes timing circuitry 125 which generates control signals for controlling the conductive state of the transistors of the switching circuitry and current sources 102, 104, 106 and 108. Timing circuitry 125 generates a distinct control signal for each transistor of the switching circuitry. In this way, write head 42 may be manipulated so as to relatively rapidly transition between steady state conditions without timing circuitry having to place relatively narrow pulsewidths on the generated control signals.

In particular, timing circuitry 125 includes logic gates or other circuits (not shown) which will provide, at any one time, one or more current paths between positive voltage supply Vcc and write head 42, and between write head 42 and negative voltage supply Vee. The specific current paths provided depend upon the particular state of write head 42. Because each transistor of the switching circuitry is independently controlled by timing circuitry 125, the switching circuitry may be relatively easily controlled to generate any of a wide variety of timing-based drive signals to write head 42. The control of the switching circuitry, and particularly the timing of the control signals thereto, to change the direction of current flow in write head 42 is described below. Timing circuitry 125 may include programmable or programmed elements, (not shown) to set the desired timing delays for the control signals generated by timing circuitry 125.

It is noted that for the control signals generated by timing circuit 125, control signal px0 is the logical complement of control signal py0; control signal px1 is the logical complement of control signal py1; control signal px2 is the logical complement of control signal py2; control signal nx0 is the logical complement of control signal ny0; control signal nx1 is the logical complement of control signal ny1; and control signal nx2 is the logical complement of control signal ny2.

Driver circuit 100 further includes resistive elements 130, 131. A resistive element 130, 131 is connected between each write head terminal and a voltage reference, such as the ground reference. The single-ended output impedance of driver circuit 100 is approximately equal to the value of resistive elements 130 and 131. Each resistive element 130, 131 may have a variable resistance to allow for the single-ended output impedances of driver circuit 100 to be adjusted to match the particular impedances of the lines connecting driver circuit 100 and write head 42.

Figure 5:
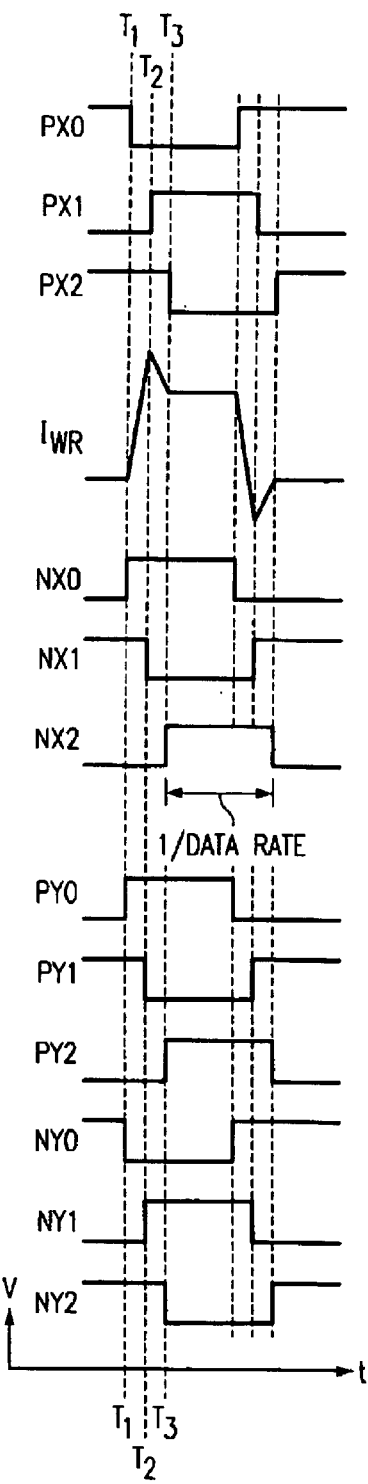
FIG. 5 is a timing diagram illustrating an operation of the write head driver circuit of FIG. 3.
Figure 6:
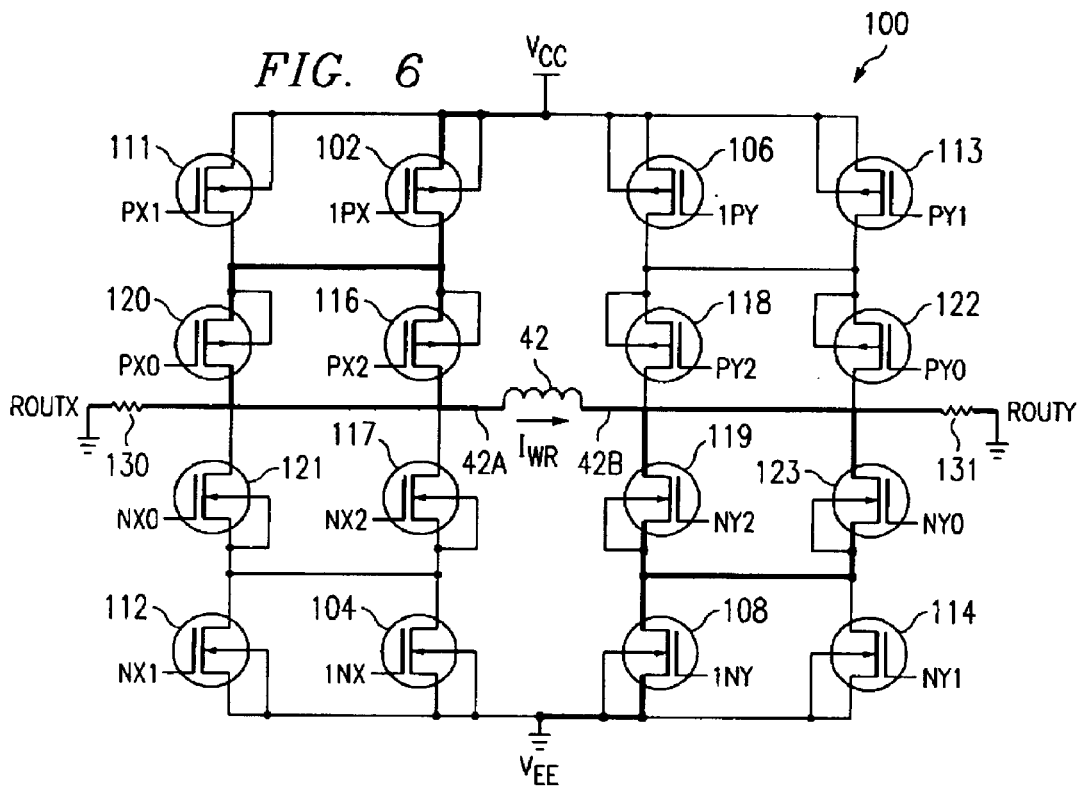
FIGS. 6–9 are circuit diagrams of the driver circuit of FIG. 3 with activated current paths highlighted therein.

An operation of driver circuit 100 will be described with reference to FIG. 5. The operation described below involves applying drive signals to write head 42 so that current flowing through write head 42 changes from a first steady state to a second steady state. Initially, it is assumed that a steady state current flows through write head 42, from terminal 42a to terminal 42b. In this state, timing circuitry 125 controls the switching circuitry so that steady state current is sourced to terminal 42a from current source 102 (via transistors 116 and 120) and sunk from terminal 42b from current source 108 (via transistors 119 and 123). Control signals px0, px2, ny0 and ny2 are driven by timing circuitry 125 to a high logic level to activate (i.e., turn on) transistors 120, 116, 123 and 119, respectively. Current sources 104 and 106 are deactivated by timing circuitry 125. Transistors 112 and 113 are activated but do not contribute to current sourcing to or sinking from write head 42. Transistors 118, 111, 122, 117, 121 and 114 are deactivated. The value of resistive elements 130 and 131 serve to set the output voltage levels for write head terminals 42a and 42b. FIG. 6 shows, in highlighted form, the activated current paths through driver circuit 100 in this steady state condition.

Figure 7:
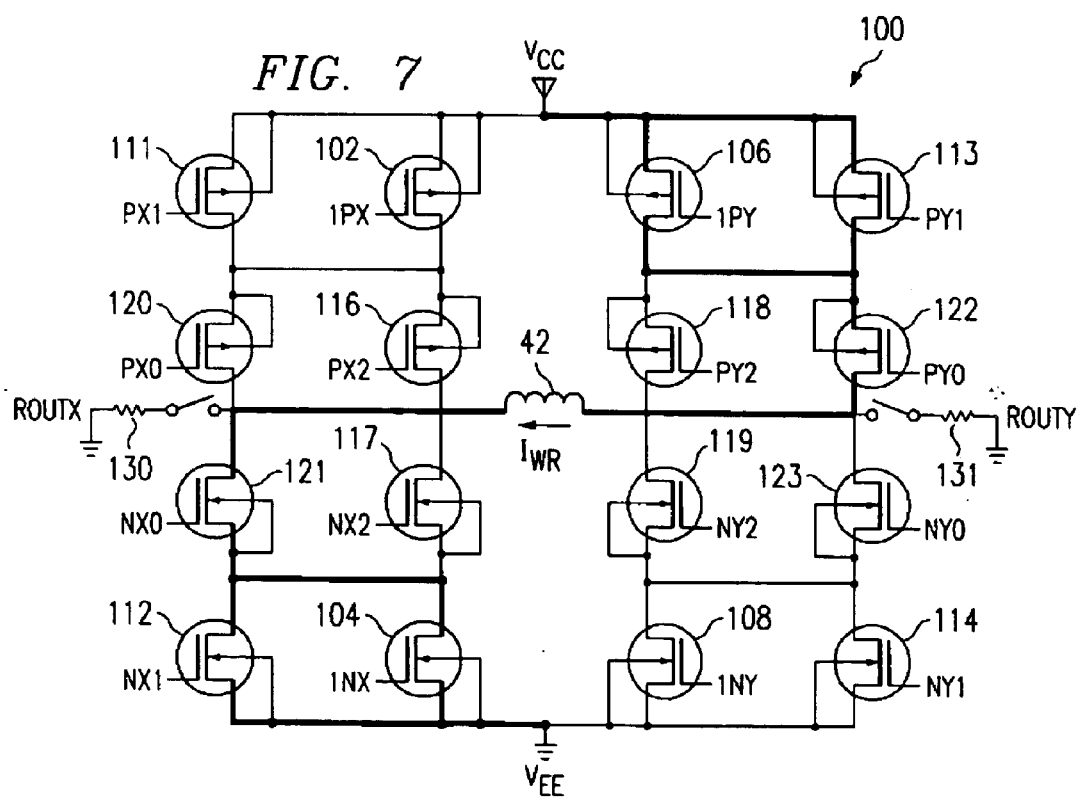

In the event a write operation is to occur that requires write head 42 to transition to the other steady state condition, timing circuitry 125 enables current paths to write head 42 to cause a current reversal at time T1. Timing circuitry 125 activates current sources 104 and 106 and deactivates current sources 102 and 108. Timing circuitry 125 also activates transistors 113, 122, 121 and 112. Transistors 111, 120, 118, 123, 114 and 117 are turned off. Transistors 116 and 119 are activated but do not serve to source/sink current relative to write head 42. This state causes write head terminal 42b to be connected to positive voltage supply Vcc and write head terminal 42a to be connected to negative voltage supply Vee. This results in a full or maximum voltage being applied across write head 42, which produces a rapid reversal of current through write head 42. At this time, resistive elements 130 and 131 may be disconnected from write head terminals 42a and 42b, respectively, in order to prevent current flow. Timing circuitry 125 maintains the switching circuitry in this state until the current flowing through write head 42 reaches a predetermined overshoot current level that is greater in magnitude than the second steady state current level (i.e., the destination steady state current level). FIG. 7 shows, in highlighted form, the activated current paths in this first time period during which write head current transitions between the two steady state current levels.

Figure 8:
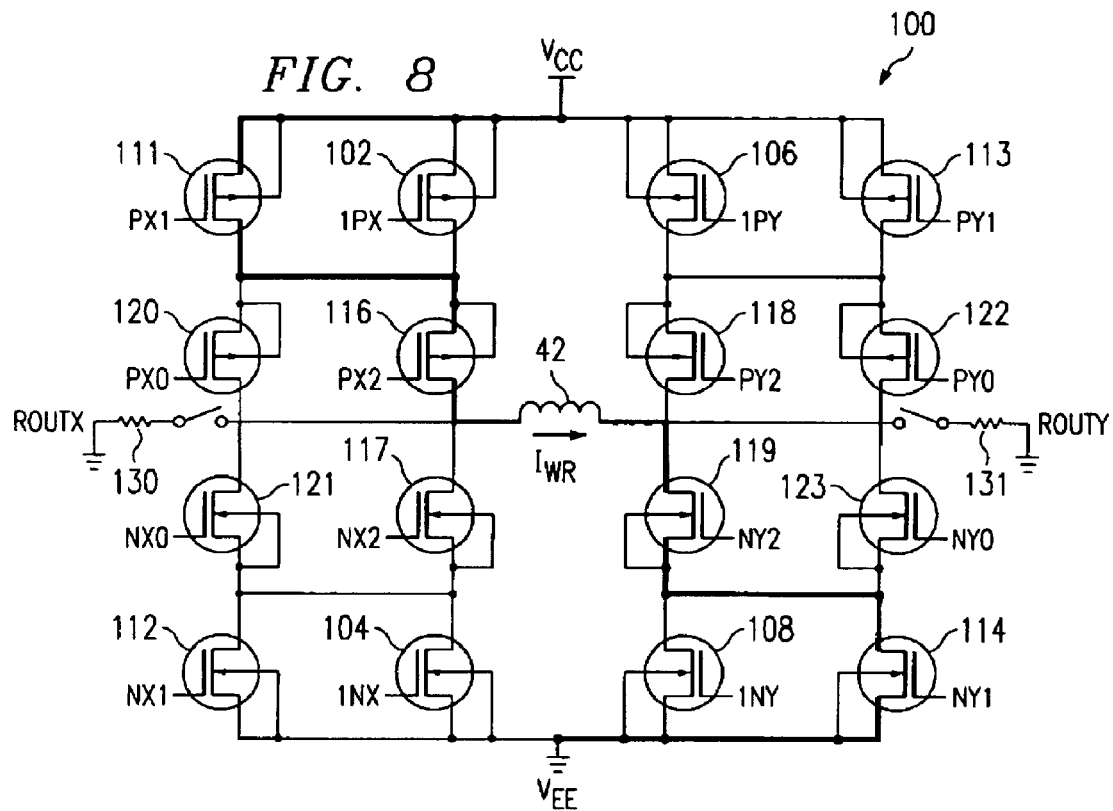

Timing circuitry 125, previously programmed to switch current paths at around the time the write head current reaches the overshoot current level, drives control signals at time T2 to temporarily reverse the drive signal voltages applied to write head 42. In particular, timing circuitry 125 drives the control signals to activate transistors 111, 116, 119 and 114. Transistors 113, 120, 118, 117, 123 and 112 are turned off. Current sources 102 and 108 are turned off. Transistors 122 and 121 and current sources 104 and 106 are turned on but do not source/sink current to/from write head 42. Resistive elements 130 and 131 may be disconnected from write head terminals 42a and 42b, respectively, in order to prevent current flow. In this state, write head terminal 42a is connected to positive voltage supply Vcc and write head terminal 42b to be connected to negative voltage supply Vee. This results in the full supply voltage applied to write head 42 to be reversed, relative to the state of write head 42 between times T1 and T2. Driver circuit 100 remains in this state for a programmed period of time corresponding to the time it takes for the write head current to reach a predetermined undershoot value that is less in magnitude than the destination steady state current level. FIG. 8 shows, in highlighted form, the activated current paths in this second time period during which write head current transitions between the two steady state current levels.

Figure 9:
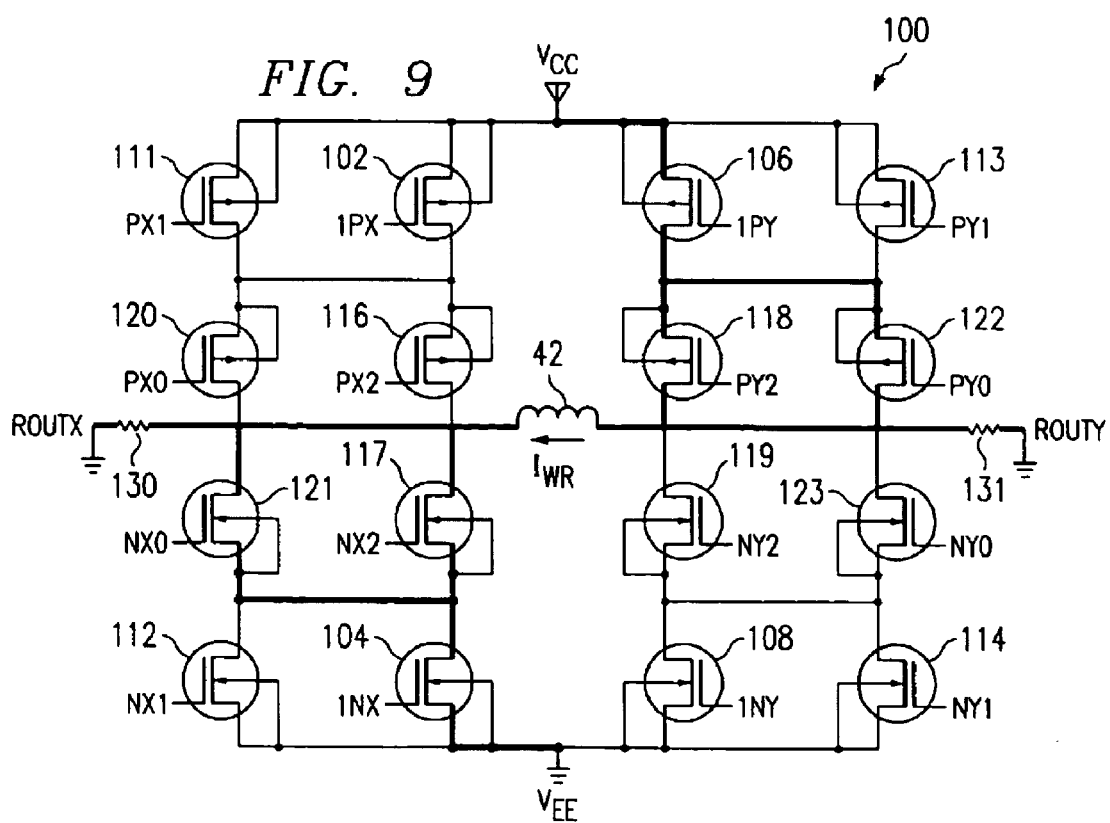

At time T3, timing circuitry 125 controls the switching circuitry so that write head 42 enters the second steady state condition. Timing circuitry 125 drives control signals so that current sources 104 and 106 sink current from and source current to write head 42, respectively. Specifically, timing circuitry activates transistors 118, 122, 121 and 117. Transistors 120, 116, 119, 113, 112 and 123 and current sources 102 and 108 are turned off. Transistors 111 and 114 are turned on but do not contribute in sourcing/sinking current relative to write head 42. In this second steady state, a steady state current level is sourced to write head terminal 42b from current source 106 (via transistors 118 and 122) and sunk from write head terminal 42a (via transistors 117 and 121). After time T3, the write head current settles to the steady state current level. The values of resistive elements 130 and 131 set the output voltage levels for write head terminals 42a and 42b, respectively. FIG. 9 shows, in highlighted form, the activated current paths in this steady state condition.

It is understood that the write head 42 may be controlled by driver circuit 100 to cause the write head current to transition back to the original steady state current level using timing for the control signals similar to that described above.

It is noted from FIG. 4 that with respect to the timing for control signals px0–px3, nx0–nx3, py0–py3 and ny0–ny3, there is no relatively narrow pulsewidth generated, such as a pulsewidth starting at time T1 and ending at time T2 or starting at time T2 and ending at time T3. In fact, the narrowest pulsewidth is the inverse or reciprocal of the data rate. By providing timing and switching circuitry having minimum pulsewidths of the inverse of the data rate, the internal speed of timing circuitry 125 and the switching circuitry may be increased so as to increase the speed at which write head 42 transitions between steady states.

It is further noted that the drive signals applied to write head terminals 42a and 42b are substantially entirely differential, i.e., the drive signals do not possess any common mode signals. Consequently, the capacitive coupling contribution of one drive signal to the read head 43 is substantially entirely offset by the capacitive coupling contribution of the other drive signal to the read head 43, thereby preventing an appreciable amount of noise on the read head 43.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driver circuit for driving a head of a memory disk device, comprising:

switching circuitry connected between a first voltage supply, a second voltage supply and first and second terminals of the head, the switching circuitry including first and second steady state switch-connected resistances each connected at one end to a corresponding one of the first and second terminals and connected at another end to a voltage reference; and timing circuitry connected to the switching circuitry for connecting the first terminal to a first voltage level during a first time period and to a second voltage level during a second time period following the first time period while disconnecting the first and second steady state switch connected resistances, and connecting the second terminal to a third voltage level during the first time period and to a fourth voltage level during the second time period while disconnecting the first and second steady state switch connected resistances, the first and second time periods occurring when current through the head transitions between steady state current levels, and the first, second, third and fourth voltage levels forming drive signals applied to the head having substantially no common mode voltage.

2. The circuit of claim 1, further comprising:

a first current source coupled to the first terminal so as to selectively source a steady state current thereto; and a second current source coupled to the first terminal so as to selectively sink a steady state current therefrom, the first and second current sources being separately connected to the first terminal via the switching circuitry when the head is in steady state conditions.

3. The circuit of claim 2, further comprising:

a third current source coupled to the second terminal so as to selectively source a steady state current thereto; and a fourth current source coupled to the second terminal so as to selectively sink a steady state current therefrom, the third and fourth current sources being separately connected to the second terminal via the switching circuitry when the head is in steady state conditions.

4. The circuit of claim 1, wherein the first and fourth voltage levels are the first voltage supply, and the second and third voltage levels are the second voltage supply.

5. The circuit of claim 1, wherein the second and fourth voltage levels are approximately positive and negative supply voltages.

6. The circuit of claim 1, wherein the first voltage level is the first voltage supply and the second voltage level is the second voltage supply.

7. The circuit of claim 1, wherein the first time period is approximately the time it takes for the current flowing through the head to transition from a first steady state current level to an overshoot current level having a greater magnitude than a second steady state current level.

8. The circuit of claim 7, wherein the second time period is approximately the time it takes for the current flowing through the head to transition from the overshoot current level to an undershoot current level having a lesser magnitude than the second steady state current level.

9. A driver circuit for driving a head of a memory disk device, comprising:

switching circuitry connected between a first voltage supply, a second voltage supply and first and second terminals of opposite ends of a write coil;

timing circuitry connected to the switching circuitry for connecting the first terminal to a first voltage level during a first time period and to a second voltage level during a second time period following the first time period, and connecting the second terminal to a third voltage level during the first time period and to a fourth voltage level during the second time period, the first and second time periods occurring when current through the head transitions between steady state current levels;

a first resistance element connected at one end to the first terminal and at another end to a ground reference; and a second resistance element connected at one end to the second terminal and at another end to the ground reference.

10. A driver circuit for driving a head of a memory disk device, comprising:

switching circuitry connected between a first voltage supply, a second voltage supply and first and second terminals of the head;

timing circuitry connected to the switching circuitry for connecting the first terminal to a first voltage level during a first time period and to a second voltage level during a second time period following the first time period, and connecting the second terminal to a third voltage level during the first time period and to a fourth voltage level during the second time period, the first and second time periods occurring when current through the head transitions between steady state current levels, and the first, second, third and fourth voltage levels forming drive signals applied to the head having substantially no common mode voltage;

a first resistance element connected between the first terminal and a ground reference; and a second resistance element connected between the second terminal and the ground reference;

wherein the first and second resistive elements are variable resistance elements.

11. The circuit of claim 9, wherein the first and second resistance elements are disconnected from the first and second terminals, respectively, during the first and second time periods.

12. The circuit of claim 1, wherein the timing circuitry provides control signals to the switching circuitry, the control signals having a minimum pulse width approximately equal to the reciprocal of the data rate of the memory disk device.

13. The circuit of claim 1, further comprising:

a first current source connected between the first voltage supply and the first terminal; and a second current source connected between the first terminal and the second voltage supply, wherein the timing circuitry selectively allows the first current source to source current to the first terminal when the head is in a first steady state, and selectively allows the second current source to sink current from the first terminal when the head is in a second steady state.

14. The circuit of claim 13, wherein the switching circuitry and the timing circuitry selectively provide current paths to the first terminal during the first and second time periods that are in parallel with current paths formed by the first and second current sources.

15. The circuit of claim 1, wherein the head is the write head of a disk drive.

16. A method of driving a head of a magnetic disk memory device which includes a first terminal and second terminal, the first terminal connected to a reference voltage through a first steady state switch connected resistance and the second terminal connected to the reference voltage through a second steady state switch connected resistance, comprising:

sourcing a first steady state current level to a first terminal of the head and sinking the first steady state current level from a second terminal of the head while the first and second steady state resistances are connected;

driving, during a first time period, the first terminal of the head to a first voltage level and driving the second terminal to a second voltage level so as to reverse the direction of current flow in the head while the first and second steady state resistances are disconnected;

driving, during a second time period following the first time period, the first terminal of the head to a third voltage level and driving the second terminal to a fourth voltage level while the first and second steady state resistances are disconnected, the first, second, third and fourth voltage levels forming drive signals for the head having approximately zero common mode voltage; and following the second period of time, sinking the first steady state current level from the first terminal and sourcing the first steady state current level to the second terminal while the first and second steady state resistances are connected.

17. The method of claim 16, wherein:
the first and fourth voltage levels are the same, and the second and third voltage levels are the same.

18. The method of claim 16, wherein:
the first and fourth voltage levels are a first voltage supply level, and the second and third voltage levels are a second voltage supply level.

19. The method of claim 16, wherein:
the third and fourth voltage levels are approximately at opposite voltage supplies, and the first and second voltage levels have substantially the same magnitude.

20. The method of claim 16, wherein the first time period is approximately the time for the current flowing through the head to transition from the first steady state current level to an overshoot current level having a magnitude greater than the second current level.

21. The method of claim 20, wherein the second time period is approximately the time for the current flowing through the head to transition from the overshoot current level to a predetermined undershoot current level having a magnitude less than the second steady state current level.

22. An apparatus, comprising
a disk drive, comprising:
at least one disk on which data is stored;
a spindle motor and controller therefor, the spindle motor being operably connected to the at least one disk;
a read head positioned proximally to the at least one disk;
read channel circuitry, coupled to the read head, for converting signals received on the read head;
a write head positioned proximally to the at least one disk and including a first terminal and a second terminal, the first terminal connected to a reference voltage through a first steady state switch connected resistance and the second terminal connected to the reference voltage through a second steady state switch connected resistance; and
write channel circuitry, coupled to the first and second terminals of the write head, for applying drive signals to the first and second terminals of the write head corresponding to data to be written onto the at least one disk, and for disconnecting the first and second steady state resistances during the time current in the write head transitions between steady state current levels.

23. The apparatus of claim 22, wherein the first and second terminals are connected to opposite supply voltage levels during a first portion of the time a current in the write head transitions between steady state current levels, and the voltage supply levels connected to the first and second terminals are reversed during a second portion of the time the current in the write head transitions between steady state current levels.

24. A disk drive, comprising:
at least one disk on which data is stored;
a spindle motor and controller therefor, the spindle motor being operably connected to the at least one disk;
a read head positioned proximally to the at least one disk;
read channel circuitry, coupled to the read head, for converting signals received on the read head;
a write head positioned proximally to the at least one disk and including a first terminal and a second terminal; and
write channel circuitry, coupled to the first and second terminals of the write head, for applying drive signals to the first and second terminals of the write head corresponding to data to be written onto the at least one disk, comprising:
a plurality of switching transistors, connected between a first voltage supply, a second voltage supply and first and second terminals of the write head;
a plurality of current sources connected between the first and second voltage supplies and the write head; and
timing circuitry, connected to the switching circuitry and the current source, for generating control signals for selectively activating the switching transistors and the current sources, the minimum pulsewidth appearing on the control signals being an inverse of the rate at which data is written on the disk.

* * * * *

UNITED STATES PATENT AND TRADEMARK OFFICE
CERTIFICATE OF CORRECTION

PATENT NO. : 6,970,316 B2
DATED : November 29, 2005
INVENTOR(S) : Alessandro Venca et al.

It is certified that error appears in the above-identified patent and that said Letters Patent is hereby corrected as shown below:

<u>Title page,</u>
Item [56], References Cited, U.S. PATENT DOCUMENTS, add the following:
-- 6,081,152    6/2000    Maley                  327/320
   6,018,257    1/2000    Hung et al.            327/112
   5,926,056    7/1999    Morris et al.          327/333
   5,751,179    5/1998    Pietruszynski et al.   327/379
   5,378,943    1/1995    Dennard                326/68 --.

Signed and Sealed this

Fourth Day of April, 2006

JON W. DUDAS
*Director of the United States Patent and Trademark Office*